United States Patent
Boundy et al.

(10) Patent No.: US 11,025,058 B2
(45) Date of Patent: Jun. 1, 2021

(54) TOLERANCE-BASED INTELLIGENT EDGE NETWORK ENERGY DELIVERY

(71) Applicant: Intel Corporation, Santa Clara, CA (US)

(72) Inventors: David Boundy, Bishopstown (IE); Michael O'Reilly, Dunshaughlin (IE); David Relihan, Multyfarnham (IE); Amit Umashankar Prasad, Celbridge (IE)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 16/584,184

(22) Filed: Sep. 26, 2019

(65) Prior Publication Data

US 2020/0021110 A1    Jan. 16, 2020

(51) Int. Cl.
| | |
|---|---|
| *H02J 3/00* | (2006.01) |
| *H02J 13/00* | (2006.01) |
| *G05B 13/02* | (2006.01) |
| *G05B 13/04* | (2006.01) |

(52) U.S. Cl.
CPC ............ *H02J 3/00* (2013.01); *G05B 13/0265* (2013.01); *G05B 13/042* (2013.01); *H02J 13/0017* (2013.01); *H02J 2203/20* (2020.01)

(58) Field of Classification Search
CPC ...... H02J 3/00; H02J 13/0017; H02J 2203/20; H02J 3/144; H02J 2310/52; G05B 13/042; G05B 13/0265; Y02E 60/00; Y02B 90/20; Y02B 70/3225; Y04S 20/222; Y04S 20/00; Y04S 50/14; Y04S 40/20; G06Q 30/0283; G06Q 10/06315; G06Q 50/06
See application file for complete search history.

(56) References Cited

U.S. PATENT DOCUMENTS

| | | | |
|---|---|---|---|
| 10,298,505 B1* | 5/2019 | Grant | H04L 12/66 |
| 2004/0225649 A1* | 11/2004 | Yeo | G01D 4/004 |
| 2010/0286937 A1* | 11/2010 | Hedley | G06Q 50/06 |
| | | | 702/60 |
| 2015/0023174 A1* | 1/2015 | Dasgupta | H04W 40/248 |
| | | | 370/236 |
| 2019/0158409 A1* | 5/2019 | Grant | H04W 28/0289 |
| 2019/0265741 A1* | 8/2019 | Boundy | H02J 3/14 |
| 2019/0296547 A1* | 9/2019 | Kelly | H04L 67/12 |
| 2019/0324431 A1* | 10/2019 | Cella | G06N 3/0436 |

* cited by examiner

*Primary Examiner* — Ramesh B Patel
(74) *Attorney, Agent, or Firm* — Schwegman Lundberg & Woessner, P.A.

(57) ABSTRACT

Systems and techniques for tolerance-based intelligent edge network energy delivery are described herein. A flexibility metric may be calculated for a node of the edge network. The flexibility metric of the node and flexibility metrics of a set of additional nodes of the edge network may be ranked to create a set of flexibility ranked edge nodes. A notification may be received of a demand response event. A candidate node subset may be identified from the set of flexibility ranked nodes based on requirements of the demand response event and a ranked order the set of flexibility ranked nodes. A demand response command may be transmitted to the candidate node subset upon determining that the candidate node subset satisfies the requirements of the demand response event. The demand response command may cause nodes of the candidate node subset to alter energy consumption for a time period of demand response event.

24 Claims, 11 Drawing Sheets

TOLERANCE-BASED INTELLIGENT EDGE NETWORK ENERGY DELIVERY

TECHNICAL FIELD

Embodiments described herein generally relate to managed energy delivery and, in some embodiments, more specifically to tolerance-based intelligent energy delivery to edge network connected devices.

BACKGROUND

An energy grid may provide energy to a variety of connected devices. For example, devices may be connected to the energy grid for energy consumption and may be internet connected. Energy fluctuations may have varying effects on the attached devices. For example, loss of electrical power to a television set is less likely to have serious impacts than loss of electrical power to a heart and lung machine in a hospital. Energy service providers may desire to perform maintenance and testing on the energy grid. The maintenance or testing may modify energy delivery to devices connected to the energy grid. The energy service provider may desire to target devices that may be able to accept more variation in energy delivery rather devices that may require more reliable energy delivery.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
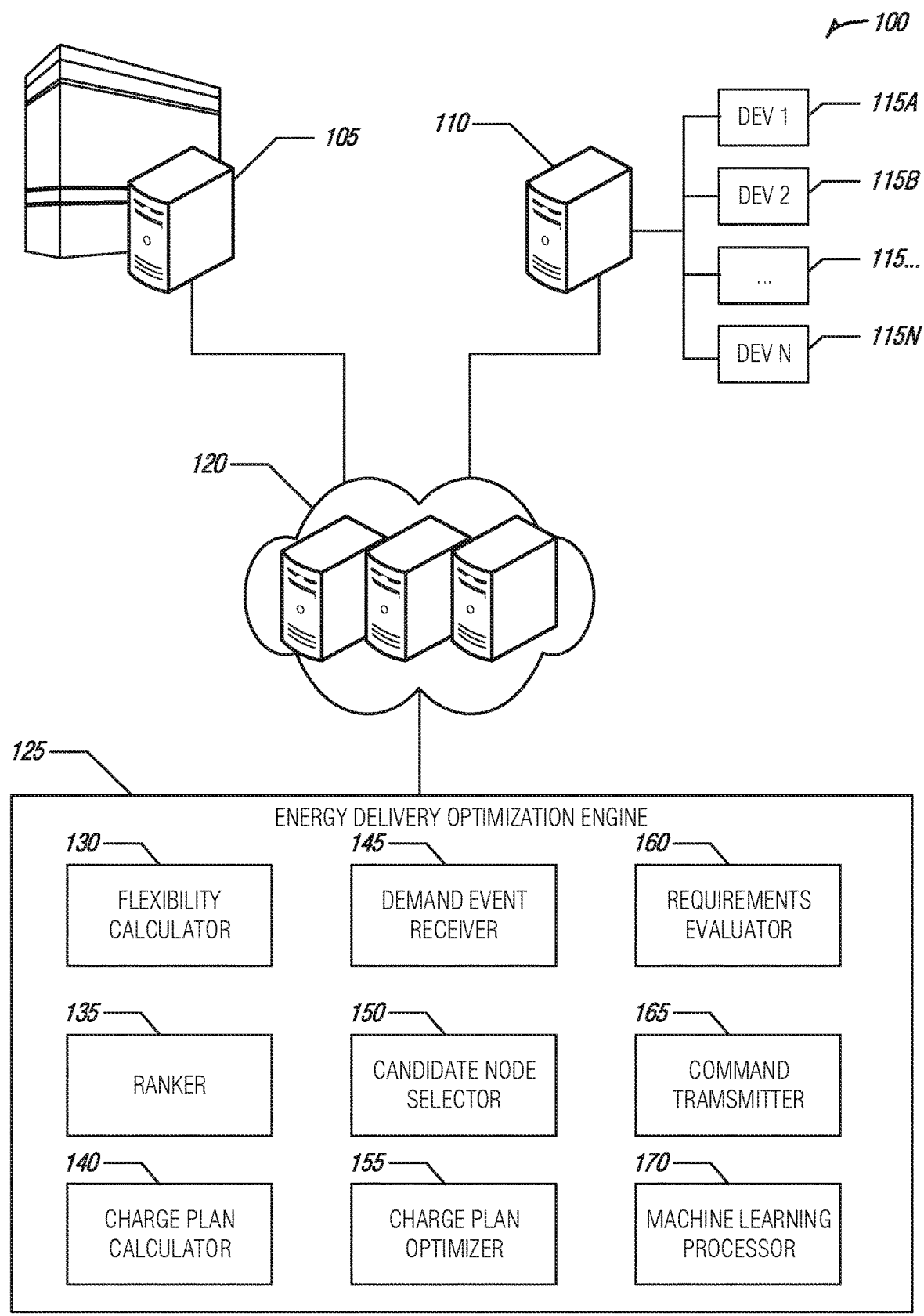
FIG. 1 is a block diagram of an example of an environment and a system for tolerance-based intelligent edge network energy delivery, according to an embodiment.

The advent of unpredictable energy generation as a result of the addition of solar, wind, and tidal energy generation, etc. makes managing energy consumption more critical. Energy consuming devices may be spread throughout an energy distribution grid. As used herein, energy may refer to energy in any form such as, for example, heat, electricity, etc. Each device may be able to tolerate differing variations in energy delivery. For example, a medical device may not be able to tolerate reduced electricity delivery while a television set may be able to tolerate a complete electricity loss. An energy grid operator may desire to vary energy delivery on the grid for a variety of reasons. For example, the operator may wish to test components of the delivery system by increasing or decreasing delivery across components or may wish to balance energy delivery across the grid during times of high energy usage.

Traditional solutions for managing variation of energy delivery to devices may not have the intelligence necessary to determine the energy variation tolerance of devices connected to the energy grid. Thus, devices that have little tolerance for variation may be negatively impacted while those with a high tolerance may not be impacted at all. In an example, tolerance may refer to tolerance of a user for disruption and a tolerance of a device to disruptions. The systems and techniques discussed herein solve this issue through modification (increase or decrease) of the energy load profile of a device through load shifting, load shedding, ramping up on site of generation and consumption, etc. Automatic control of end-user energy systems is provided while minimizing the impact on occupants and operations. Reduced computation and response time are achieved for generating optimal device charging schedules.

Machine learning is used to predict tolerance for planned outages based on learned energy demands over a period of time. Normally, artificial intelligence (AI) models need a certain amount of training data to produce efficient results. To overcome this possible limitation, a recommender system is needed to more rapidly realize cost benefits for new devices joining a smart energy grid. This allows a new device or set of devices to start from a relatively effective model until the energy demands are learned.

Conventional solutions may, for example, assess thermal performance of buildings based on a physical inspection to determine thermal energy usage. The systems and techniques discussed herein calculate flexibility dynamically allowing for management of energy storage of any form. Energy companies currently do not have a functional solution that provides an optimal commencement machine learning model that reflects tolerance for planned interruption. The systems and techniques discussed herein calculate a flexibility value that symbolizes user tolerance to an outage and unavailability of a device.

The dynamic flexibility of a device is expressed based on device metrics and associated environmental conditions. Dynamic Flexibility is calculated at the device level and is used by a centralized decision engine to modify the load profile of the device, or a group of devices, to minimize the impact to the user. This calculation is repeated at a regular pulse for every device so that the central system has a real time picture of the Dynamic Flexibility of all devices. Flexibility is calculated dynamically using historic measurements, user defined setting, and AI prediction models. These models may be shared across a community of devices in order to speed up the efficiency of the AI predictions for new devices which are added to a fleet of devices under the systems control.

When a new customer enters a community, the highest ranked model based on a similarity recommender function is used as the commencement model for the customer. The commencement model is dynamic and may be swapped for the next ranked model if the model is not fit for purpose. Once a critical mass of customer usage data (e.g., usage data for a collection of user devices, etc.) has been recorded, this starting model will be retrained and retuned to match the customer's usage patterns and requirements.

This provides a workable solution immediately to the customer by not having to build up a critical mass of data before initiating model training. This means customers benefit from immediate cost savings which results in increased satisfaction and more optimal energy performance (e.g., better comfort, power utilization, etc.) at the customer premise.

Current power-grid systems support a dynamic energy pricing scheme which typically exhibits a recurring day/night pricing pattern as well as price fluctuations during the day depending on the weather conditions. Such an environment/system facilitates the need for having intelligent energy consuming devices that can adapt to such pricing patterns to minimize their costs. Devices supporting activities of heating ventilation and air conditioning (HVAC) have attracted the greatest interest as these are equipped with storage capacities and may be one of the highest power consuming devices in a facility (e.g., household, office, etc.). This storage feature allows a user to schedule charging of these devices ahead of time. This scheduling may be manual or may be adapted according to a dynamic energy pricing scheme. Previous solutions focus on generating optimized device charging schedules with greater accuracy and do not focus on the scale at which these systems are deployed.

The systems and techniques discussed herein reduce the computation and response time of generating optimal device charging schedules by offloading the processing of optimal device charging schedules to consumer installed devices and merging schedule solutions discovered by semantically similar devices. This reduces the processing done on the server and increases scaling which reduces the time required to generate a charge plan. A charge requirement may be an encoded message (e.g., using JavaScript object notation (JSON), etc.) that typically represents the device schematics and energy discharging times set by the user. A charge plan may be an encoded response (e.g., using JSON, etc.) for this charge requirement generated by an optimization engine that instructs the device to charge during a certain time during the day. A charge plan is generated using a machine learning optimization technique. The optimization is done on two levels—device level and community level. For determining the optimal charge plan each device sends its charge requirement to the optimization server. These requirements are relayed through a gateway device installed at the consumer site with processing capabilities. The charge plans are then evaluated at the community level to arrive at an optimized charge plan.

FIG. 1 is a block diagram of an example of an environment 100 and a system 125 for tolerance-based intelligent edge network energy delivery, according to an embodiment. The environment 100 may include a utility server 105 (e.g., a system of a utility company, energy grid provider, etc.) and an edge node 110 (e.g., a gateway device at a customer premise, etc.) that is communicatively coupled to devices 115A-N. The utility server 105 and the edge node 110 may be communicatively coupled via wireless network, wired network, cellular network, the internet, etc.) to a cloud service provider 120 (e.g., a collection of computer storage and computing facilities connected to the internet (or otherwise directly or indirectly connected) to constituent devices). The cloud service provider 120 may run a variety of energy management system including system 125. In an example, system 125 may be an energy delivery optimization engine. The system 125 may include a variety of components such as a flexibility calculator 130, a ranker 135, a charge plan calculator 140, a demand event receiver 145, a candidate node selector 150, a charge plan optimizer 155, a requirements evaluator 160, a command transmitter 165, and a machine learning processor 170.

Figure 11:
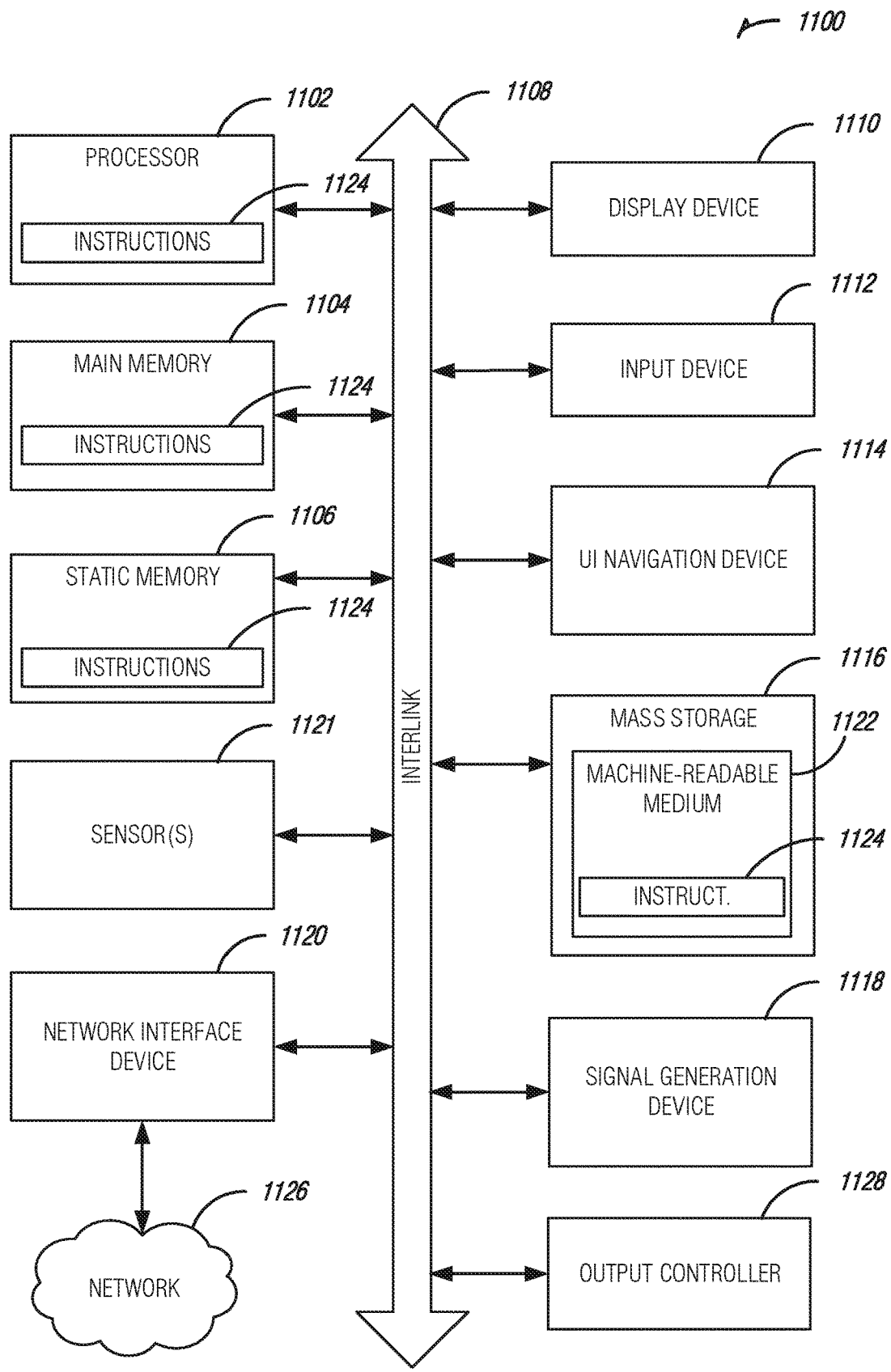
FIG. 11 is a block diagram illustrating an example of a machine upon which one or more embodiments may be implemented.

The flexibility calculator 130, the ranker 135, the charge plan calculator 140, the demand event receiver 145, the candidate node selector 150, the charge plan optimizer 155, the requirements evaluator 160, the command transmitter 165, and the machine learning processor 170 may comprise one or more processors (e.g., hardware processor 1102 described in FIG. 11, etc.) that execute software instructions, such as those used to define a software or computer program, stored in a computer-readable storage medium such as a memory device (e.g., a main memory 1104 and a static memory 1106 as described in FIG. 11, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the flexibility calculator 130, the ranker 135, the charge plan calculator 140, the demand event receiver 145, the candidate node selector 150, the charge plan optimizer 155, the requirements evaluator 160, the command transmitter 165, and the machine learning processor 170 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

The edge node 110 may act as a gateway for the devices 115A-N that consume energy from an energy grid to which the utility server 105 monitors. The devices 115A-N may include a variety of devices that communicate with the edge node 110 via a variety of communication mediums such as, for example, short range radio, wireless network, wireless network, shared bus, etc. The devices 115A-N may consume energy in many forms including heating, cooling, electricity, and the like. The devices 115A-N may provide a variety of functions such as, for example, computing, data storage, heating, cooling, ventilation, machine operation, etc. The devices 115A-N may transmit metrics regarding operation such as, for example, minimum and maximum operating temperature, power consumption, available power states (e.g., economy mode, standard mode, high power mode, etc.), whether the device load is critical or non-critical, etc.

The flexibility calculator 130 may calculate a flexibility metric for the edge node 110. In an example, a set of device metrics of the devices 115A-N may be obtained from the edge node 110 and the flexibility metric for the edge node may calculated based on the set of device metrics. For example, the edge node 110 may evaluate the connected devices 115A-N to determine a total minimum and maximum energy consumption values for the collection of devices 115A-N. The minimum or maximum values may then be used to establish a flexibility metric for the edge node 110. In an example, the flexibility metric may be a range of possible energy consumption values under which the devices 115A-N connected to the edge node 110 continue to function without an impact to a user of the devices 115A-N. The flexibility metric may be an indicator of a tolerance of the edge node 110 connected devices 115A-N to fluctuations in energy delivery.

Dynamic flexibility may be calculated in various ways by the flexibility calculator 130 to suit each specific device and may then be normalized across devices to provide a comparable metric. In an example, flexibility may be based on three variables: (1) Fulfilment (f) The ability of the service to meet the end users requirements, (2) Time—(i) An expression of the time requirement to meet the Fulfilment level, and (3) Tolerance—The amount of permissible deviation from the Fulfilment level.

$$f\text{-}I \text{ calculation} = (f \times i)$$

f is expressed as a % where 1=energy to meet service requirement has been delivered, $f=e_n/e_0$ where $e_0$ Energy kilowatts (KW) where f=1, $e_n$ Energy stored now, f may be >100% (e.g., where room is cooled below the set-point), f may vary with time and needs to be recalculated on a defined cadence.

To incorporate tolerance, high and low levels of fulfillment are used ($f_l$ & $f_h$). Logic on the device determines which flexibility to publish (e.g., high or low) based on a mode the device is set to (e.g., if in cooling use $f_l$, if in heating use $f_h$). Where $f_l$=energy required to meet the lower tolerance threshold $f_l=e_n/e_l$, $e_l$ Energy (KW) where $f_l$=1, $f_h$=energy required to meet the lower tolerance threshold $f_h=e_n/e_h$, $e_h$ Energy (KW) where $f_h$=1.

I expressed as a %, $$i = \left(\left((t_o - t_n) - \left(\frac{\frac{e_0 - e_n}{r_e}}{24}\right) * 864000\right) \bigg/ (t_0 - t_n)\right) * i_f(t_o - t_n, <0, 0, 1)$$

where $t_0$ Time (unix epoch) where f is required to =1, $t_n$ Time (unix epoch) now, and $r_e$ Rate of energy delivery (KWh).

A Dynamic Flexibility Forecast may be used for end users to define a demand response event. A demand response event, for example, is the intentional shedding or ramping up of load.

Fulfillment:

f expressed as a %, where 1−energy to meet service requirement has been delivered, $f=e_{nc}/e_{0v}$, where $e_{0v}$ Energy (KW) where f=1*% change in energy required for discharge at $t_x$, $e_{nc}$ Anticipated energy stored at $t_x$. Where charging or discharging has occurred between $t_n$ and $t_x$, $e_{nc}=((t_x-\text{Now}(\ ))-e_0$ ($e_0$ as specified above), where $e_{nc}$>Upper_SOC then limit $e_{nc}$=to Upper_SOC. This does not account for limitations set by charge plans or by charge window restrictions. Where time restrictions apply (e.g., 00:00-07:00, etc.), i=0 for restricted hours, f may be >100% (e.g., where a room is cooled below a set-point, etc.), f may vary with time and may need to be recalculated on a defined cadence.

Time:

I expressed as a %, $$i = \left(\left((t_o - t_x) - \left(\frac{\frac{e_0 * v - e_n - c}{r_e}}{24}\right) * 864000\right) \bigg/ (t_0 - t_x)\right) * i_f(t_o - t_x, <0, 0, 1)$$

where $t_0$ Time (unix epoch) where f is required to =1, $t_x$ Time (unix epoch) future time from now, and $r_e$ Rate of energy delivery (KWh), v Future energy requirement fluctuation (e.g., due to anticipated change in ambient temperature, etc.), c Change in amount of energy stored between $t_n$ and $t_x$ (e.g., battery charging, etc.).

The ranker 135 may rank the flexibility metric for the edge node 110 and flexibility metrics for a set of additional nodes to create a set of flexibility ranked edge nodes. In an example, the ranker 135 may rank the nodes in a descending or ascending order based on the values (e.g., expanse of the range between minimum and maximum, maximum energy consumption, minimum energy consumption, most non-critical devices, least non-critical devices, etc.) corresponding to the respective flexibility metric of each node. For example, nodes that are most tolerant to energy fluctuation may be ranked higher than nodes that are lease tolerant to energy fluctuations.

The demand event receiver 145 may receive a notification of a demand response event. In an example, the demand response event may be an event that will alter (e.g., increase, decrease, etc.) energy delivery on the energy grid. For example, the energy grid provider may need to service delivery equipment on the grid and may need to reduce energy delivery for a period of time. In another example, the energy grid provider may be running a load test and may need to increase energy delivery for a period of time. The demand response event may have corresponding requirements (e.g., maximum/minimum energy requirement, time duration, grid segment, etc.). The demand event receiver 145 may work in conjunction with other components in the system 125 to initiate a selection process to determine if there are sufficient nodes with flexibility metrics to meet the requirements of the demand response event.

The candidate node selector 150 may work in conjunction with the requirements evaluator 160 to identify a candidate node subset from the set of flexibility ranked nodes based on requirements of the demand response event and a ranked order of the set of flexibility ranked nodes. In an example, an energy consumption value may be determined for each member of the set of flexibility ranked nodes. The requirements evaluator 160 may identify an energy need value that is included in the requirements of the demand response event. Members of the set of flexibility ranked nodes may be selected for inclusion in the candidate node subset based on the energy consumption value for each member until the energy need value is reached. In an example, the members may be selected in order based on their respective flexibility rank.

For example, nodes A, B, C, D, E, and F may be ranked by flexibility metrics. The demand response event may require two megawatts of reduced power delivery. Node A may be ranked as having the highest flexibility ranking with the ability to reduce power consumption by one megawatt. Node B may be second ranked and may be able to reduce power consumption by one half megawatt. Nodes C and D may be ranked third and fourth respectively (or tied for third) and may each be able to reduce power consumption by one quarter megawatt. Nodes A, B, C, and D may be added to the candidate node subset because combined they are able to meet the two-megawatt requirement while nodes E and F are not included because the requirement has been met. It may be understood that a variety of ranking and selection algorithms may be used by the candidate node selector to optimize selection of candidate nodes.

The command transmitter 165 may transmit and demand response command to the candidate node subset upon the requirements evaluator 160 determining that the candidate node subset satisfies the requirements of the demand response event. In an example, the demand response command causes nodes of the candidate node subset to alter energy consumption for a time period coinciding with the demand response event. In an example, the command transmitter 165 may track execution of the demand response command by members of the candidate node subset. The requirements evaluator 160 may determine that the requirements of the demand response event were met (e.g., enough of the nodes processed the command to meet the requirements, etc.) and a notification of successful completion of the demand response event may be transmitted to a computing device. In an example, a notification may be communicated to a user interface of a computing device on a network on the energy grid provider network, a network of the node, etc. In an example, the notification may be a command that causes the demand response event to proceed automatically upon successful completion of the demand response commands. For example, the notification may cause the energy grid control systems to shed power to segments of a power grid in preparation for maintenance, etc.

Figure 2:
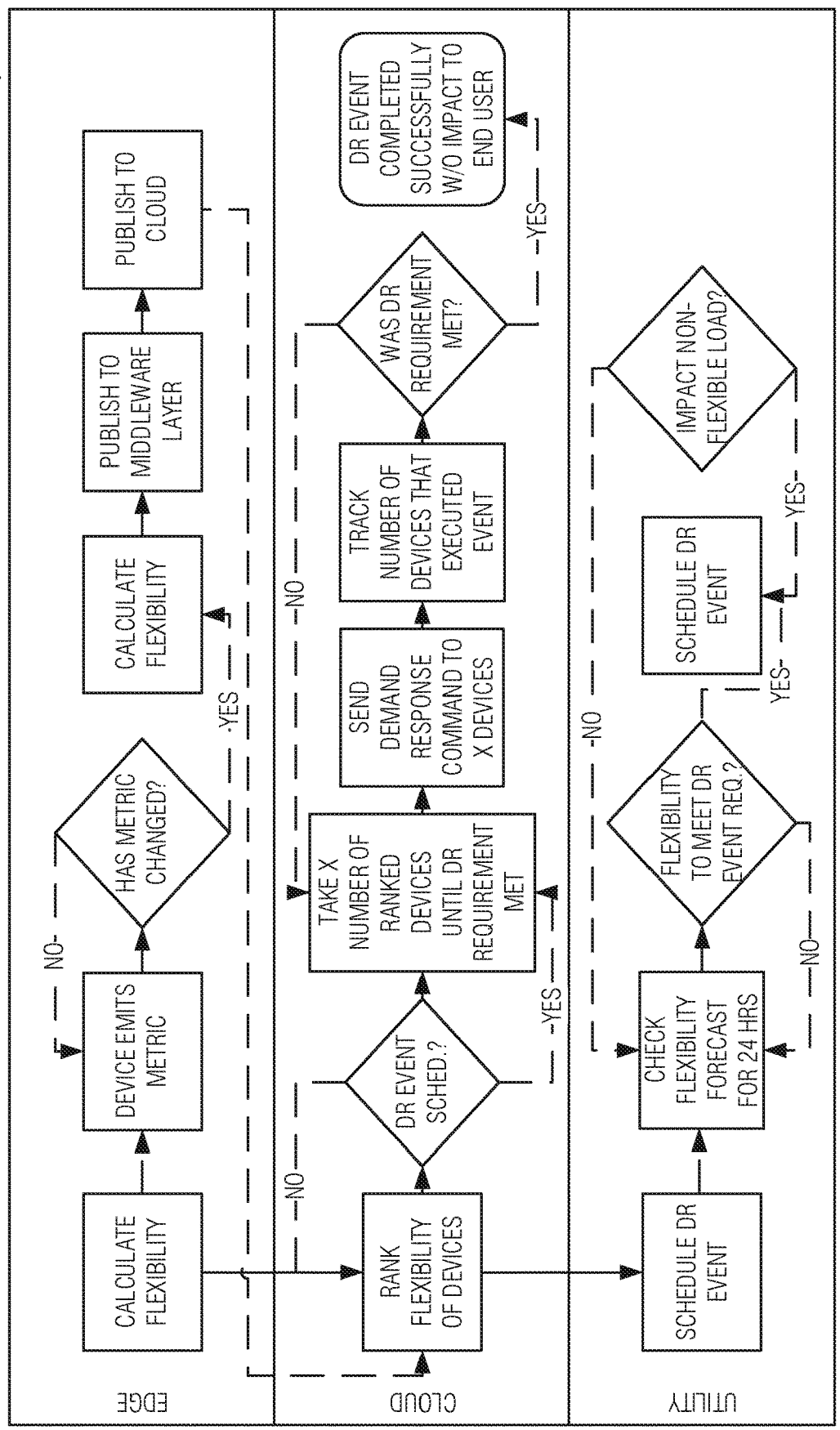
FIG. 2 illustrates a block diagram of an example of a process for addressing a demand response with dynamic flexibility for tolerance-based intelligent edge network energy delivery, according to an embodiment.

FIG. 2 illustrates a block diagram of an example of a process 200 for addressing a demand response with dynamic flexibility for tolerance-based intelligent edge network energy delivery, according to an embodiment. The process 200 may provide features as described in FIG. 1.

In process 200, dynamic flexibility is calculated (e.g., by the flexibility calculator 130 as described in FIG. 1, etc.) at the device level and is used by the centralized decision engine to modify (e.g., based on commands transmitted by the command transmitter 165 as described in FIG. 1, etc.) the load profile of the device. Flexibility must account for end user requirements or contract thresholds, or a combination of end user requirements and contact thresholds.

Returning to the description of FIG. 1, in an example, the flexibility of nodes may be verified before a demand response event is scheduled. In an example, the requirements evaluator 160 may determine that the set of flexibility ranked nodes have a combined flexibility metrics to satisfy a proposed demand response event and may schedule the proposed demand response event for execution by the set of flexibility ranked nodes. For example, a cooling requirement may be evaluated for a set of devices 115 communicatively coupled to the edge node 110 and the cooling requirement may be used to determine a flexibility metric for the edge node 110. The energy grid provider may desire to reduce power delivered to cooling equipment across a collection of nodes. It may be determined if the minimum cooling requirements of the edge node 110 and other edge nodes is sufficient to meet the required power reduction. If so, the power reduction event may be scheduled. At the time of the cooling power reduction event, the nodes may (or may not) be reevaluated as described above to verify that the cooling power reduction event will not have an impact to users.

Machine learning processor 170 may be used to generate models for calculating flexibility metrics for the edge node 110. The machine learning processor 170 may receive device metrics from the edge node 110 and the metrics may be evaluated to generate a flexibility model for a profile (e.g., device profile, energy consumption profile, etc.) of the edge node 110. As new nodes are added to the communication network of the energy grid, a flexibility model may be selected for the new node based on how closely the profile of the new node fits an existing flexibility profile. This allows a flexibility metric to be created for the new node without evaluating metric history of the new node.

Figure 3:
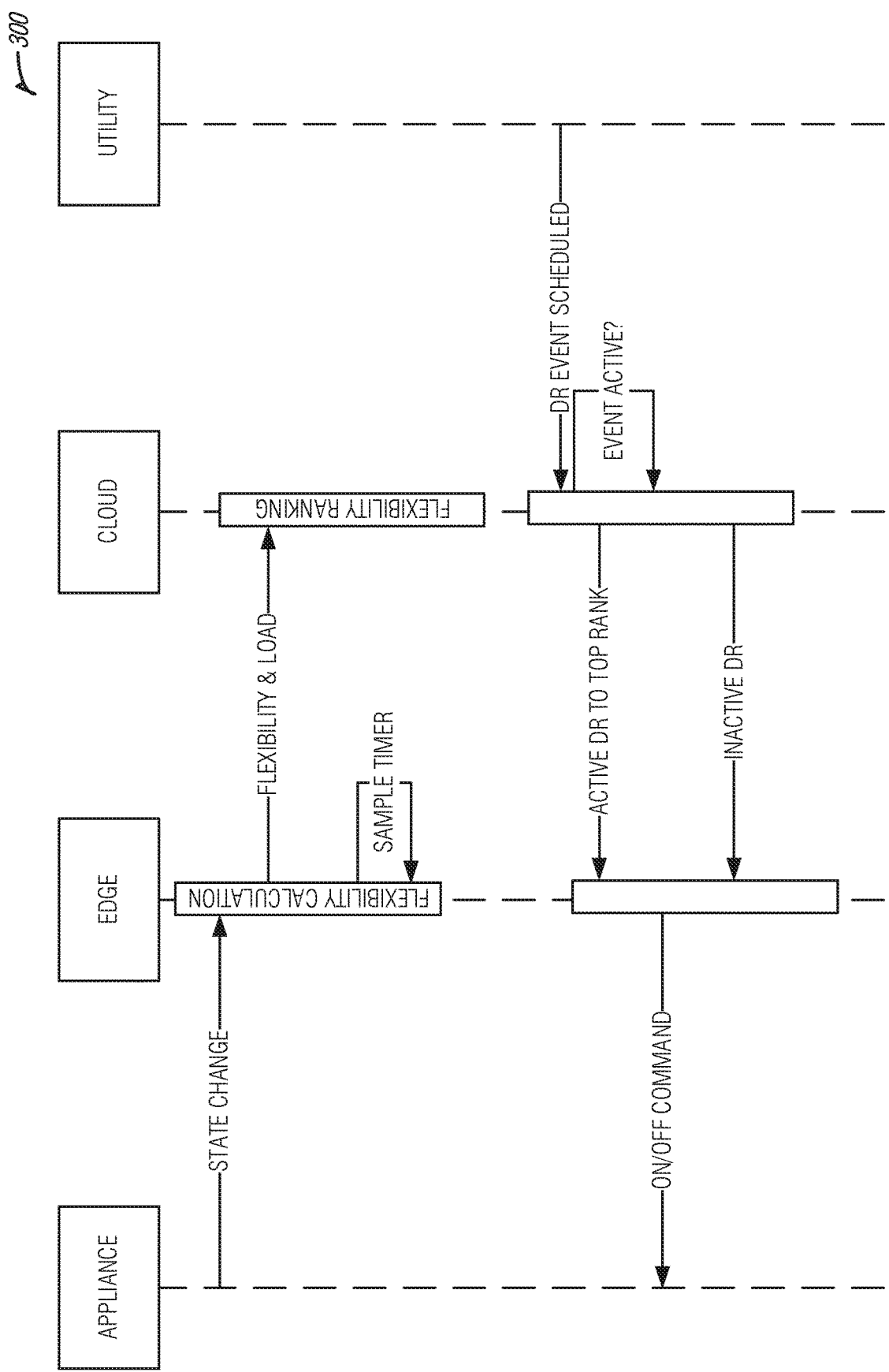
FIG. 3 illustrates a sequence diagram of an example of a demand response use case for tolerance-based intelligent edge network energy delivery, according to an embodiment.

FIG. 3 illustrates a sequence diagram 300 of an example of a demand response use case for tolerance-based intelligent edge network energy delivery, according to an embodiment. The sequence diagram 300 may provide features as described in FIGS. 1 and 2. When new customers join a smart energy grid that supports tolerance-based intelligent edge network energy delivery, there may be no reliable and pre-existing customer data available which may be used to indicate usage patterns and tolerance to planned disruptions to service.

Returning to the description of FIG. 1, in an example, the machine learning processor 170 may generate a flexibility model for the edge node 110. The flexibility model may be added to a set of flexibility models. A new node may be identified that is connected to an energy grid. A commencement flexibility model may be selected for the new node from the set of flexibility models based on a fit between metrics of the new node and the commencement flexibility model. A flexibility metric may be determined for the new node using the commencement model and the node may be added to the set of flexibility ranked nodes based on the flexibility metric for the new node.

Figure 4:
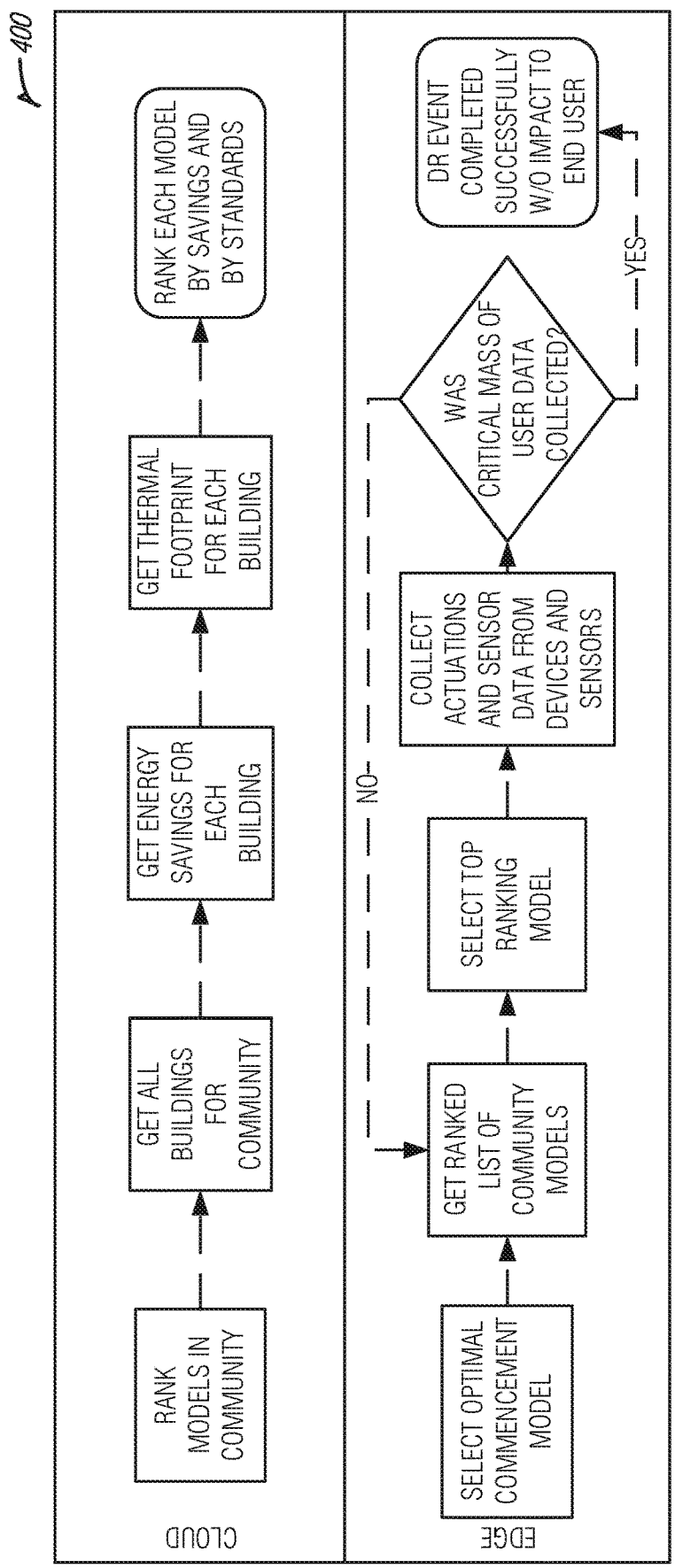
FIG. 4 illustrates a block diagram of an example of a process for delivering an optimal customer commencement profile for tolerance-based intelligent edge network energy delivery, according to an embodiment.

FIG. 4 illustrates a block diagram of an example of a process 400 for delivering an optimal customer commencement profile for tolerance-based intelligent edge network energy delivery, according to an embodiment. The process 400 may provide features as described in FIGS. 1-3. A machine learning processor (e.g., the machine learning processor 170 as described in FIG. 1, etc.) may predict customer temperature requirements based on environmental factors. The predictive model is used to predict the user's tolerance for interruption for the next 24 Hours. Each building model within a community is ranked. A variety of factors may be used to rank the model. By way of example and not limitation, two factors may be used to rank the model:

1. Most economical in terms of cost saving for the customer. We have this data as we are already automating energy usage to save money for the customer.

2. Thermal Comfort as specified in American National Standards Institute (ANSI)/American Society of Heating Refrigerating, and Air-Conditioning Engineers (ASHRAE) Standard 55: Thermal Environmental Conditions for Human Occupancy. The standard establishes the ranges of indoor environmental conditions to achieve acceptable thermal comfort for occupants of buildings.

Buildings within a community may have similar features. For example, buildings may have similar building energy ratings and numbers of occupants. When a new customer joins the service, they are added to a community. The highest ranked building model based on a similarity function is used as the commencement model for the customer. The model is dynamic and will be swapped for the next ranked model if the model is not fit for purpose.

Once a critical mass of customer usage data has been recorded, the starting model will be retrained and retuned. This model will then match the usage patterns and requirements of the customer.

Returning to the description of FIG. 1, in an example, a set of data points may be collected from a set of devices 115 communicatively coupled to the edge node 110. The machine learning processor 170 may need a minimum amount of training data to generate a flexibility model. If the inputs are insufficient, additional inputs may be collected before training commences. It may be determined that the set of data points is sufficient to generate the flexibility model and a deep neural network may be trained using the set of data points. The flexibility model may be a deep neural network model that is output based on the training.

Figure 5:
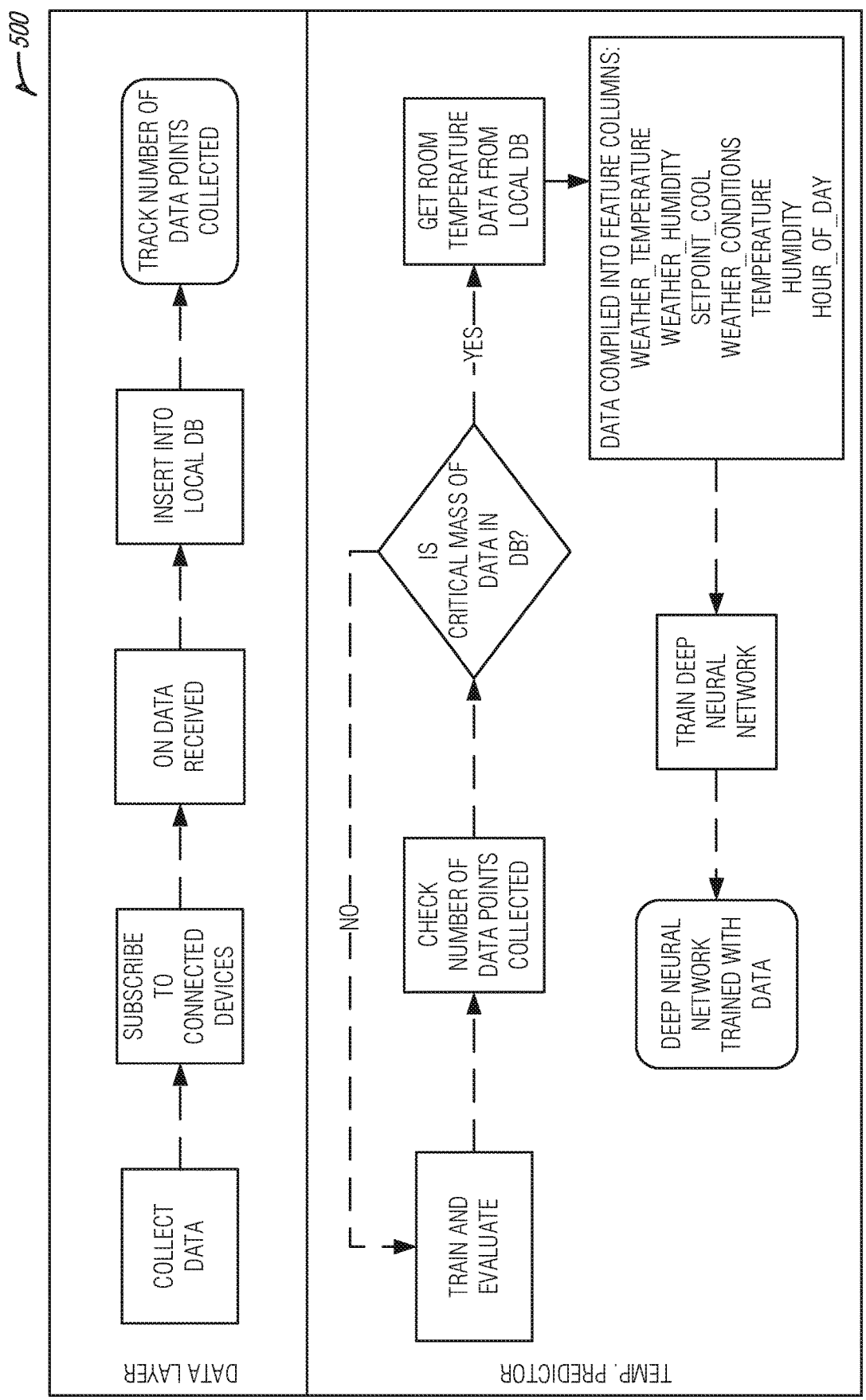
FIG. 5 illustrates a block diagram of an example of a process for temperature prediction for tolerance-based intelligent edge network energy delivery, according to an embodiment.

FIG. 5 illustrates a block diagram of an example of a process 500 for temperature prediction for tolerance-based intelligent edge network energy delivery, according to an embodiment. The process 500 may provide features as described in FIGS. 1-4. The process 500 illustrates an example of how the commencement model is trained once a critical mass of data is collected. This example shows how the system has been applied to a heating use case.

The benefit of this solution for customers is that an flexibility metric may be generated immediately without having to build up a critical mass of data before initiating model training. This means customers benefit from immediate cost savings which results in increased satisfaction and more optimal heating performance (hence comfort).

Returning to the description of FIG. 1, in an example, the flexibility model may be added to the set of flexibility models based on accuracy of flexibility predictions calculated for a device by the flexibility model.

Figure 6:
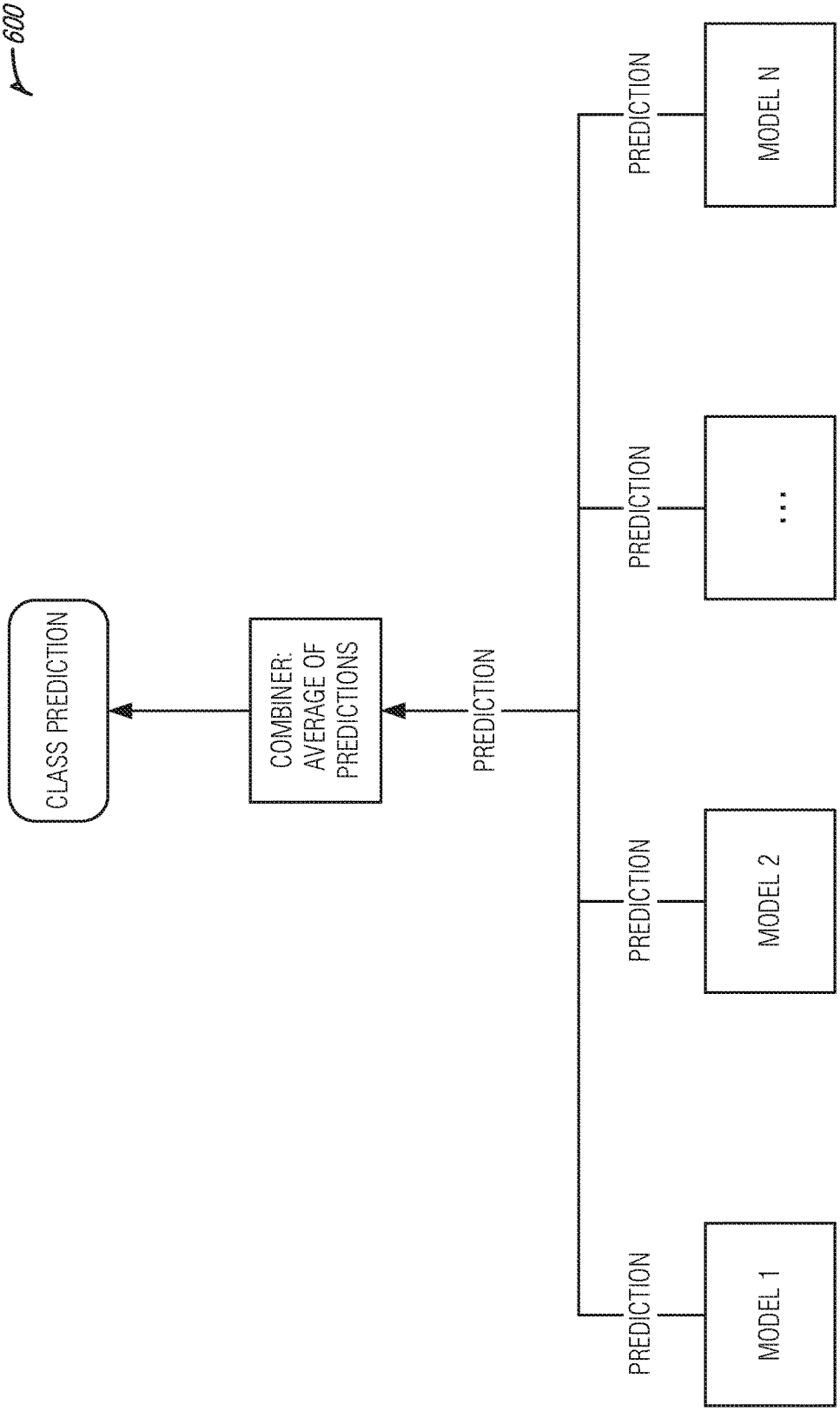
FIG. 6 illustrates a block diagram of an example of a multi-model predictor for tolerance-based intelligent edge network energy delivery, according to an embodiment.

FIG. 6 illustrates a block diagram of an example of a multi-model predictor 600 for tolerance-based intelligent edge network energy delivery, according to an embodiment. The multi-model predictor 600 may provide features as described in FIGS. 1-5.

To further increase prediction accuracy, more than one commencement model may be used. FIG. 6 gives an overview of this. If there is more than one model candidate, multiple possible commencement models may be returned. As the same model is trained with different data, the predictions from the X models are taken and the average is taken to get a more accurate prediction.

Figure 7:
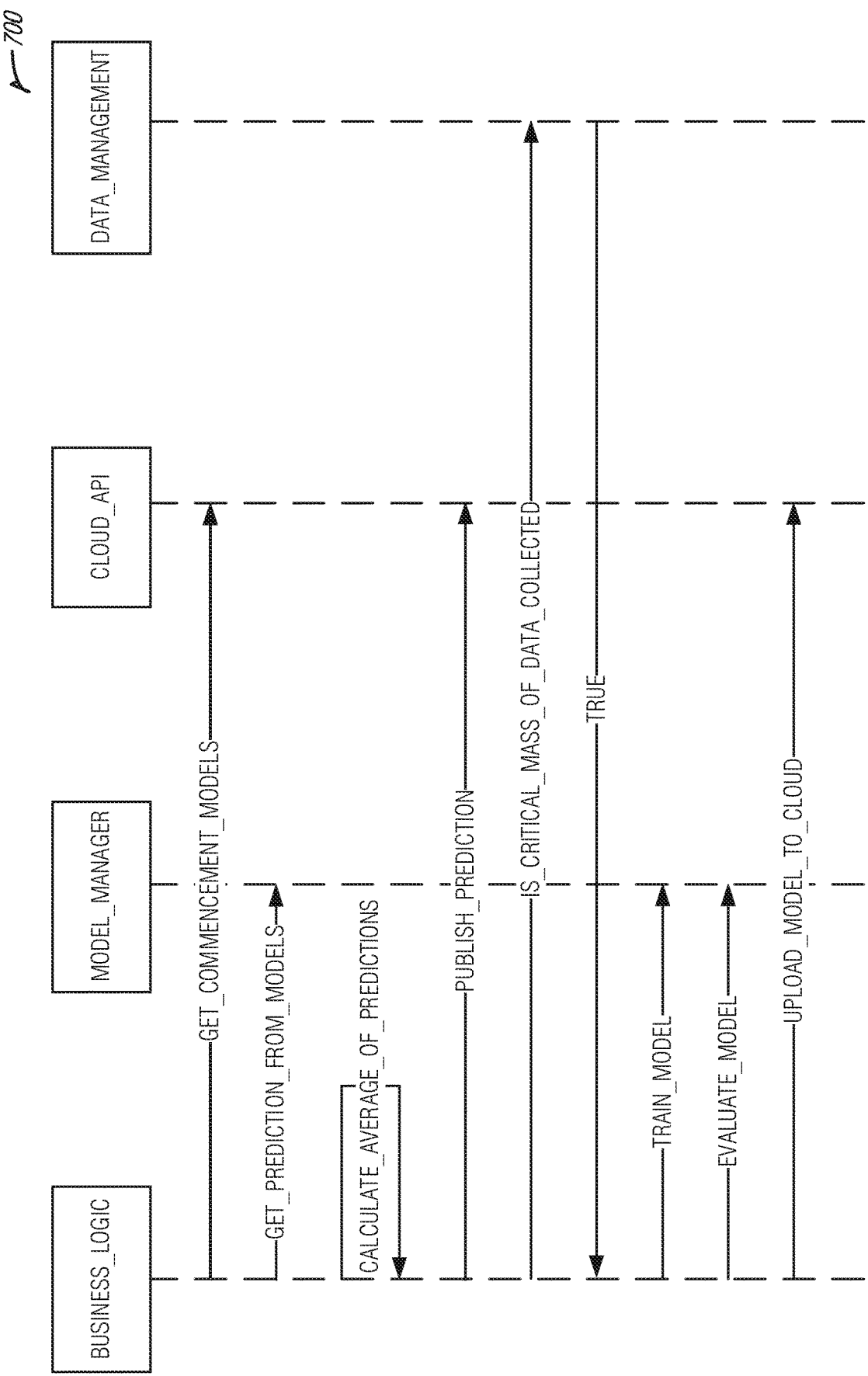
FIG. 7 illustrates a sequence diagram of an example of data flow for an edge device for tolerance-based intelligent edge network energy delivery, according to an embodiment.

FIG. 7 illustrates a sequence diagram 700 of an example of data flow for an edge device for tolerance-based intelligent edge network energy delivery, according to an embodiment. The sequence diagram 700 may provide features as described in FIGS. 1-6.

Sequence diagram 700 demonstrate how the operates from the point of view of the edge device (e.g., edge node 110 as described in FIG. 1, etc.). The edge device may download multiple models. A prediction is obtained from each of the models and an average of the predictions. The prediction is published to the cloud (e.g., cloud service provider 120, etc.). Once a critical mass of data is collected, the top model received from the cloud is trained with the collected data. The model is evaluated for effectiveness. For example, the model may be evaluated for loss, average loss and Root Mean Squared Error. The model along with the metrics are uploaded to the cloud. This new model is now a candidate for a commencement model for new customers.

Returning to the description of FIG. 1, charge plans may be created for devices connected to the energy grid to optimize energy utilization. In an example, the charge plan calculator 140 may obtain charge requirements from a set of devices connected to an energy grid. The charge plan optimizer 155 may generate a charge plan for a device of the set of devices and the charge plan may be transmitted to the device. In an example, the charge plan optimizer 155 may determine that the device is communicatively coupled to a gateway device (e.g., edge node 110, etc.) and may instruct the gateway device to generate the charge plan and transmit the charge plan to the device. In an example, the charge plan optimizer may receive the charge plan from the gateway device and may add the charge plan to a set of community charge plans. The set of community charge plans includes additional charge plans received from other gateway devices. The charge plan optimizer 155 may generate a community optimal charge plan based on an evaluation of the set of community charge plans and may transmit the community optimal charge plan to the gateway device.

The community optimal charge plan may be based on a number of factors such as, for example, costs, device similarity, power conservation, and the like. In an example, generation of the community optimal charge plan includes evaluating costs of individual members of the set of community charge plans. In another example, generation of the community optimal charge plan includes identification of devices having similar characteristics and evaluating the devices having similar characteristics as a group when evaluating the set of community charge plans.

Figure 8:
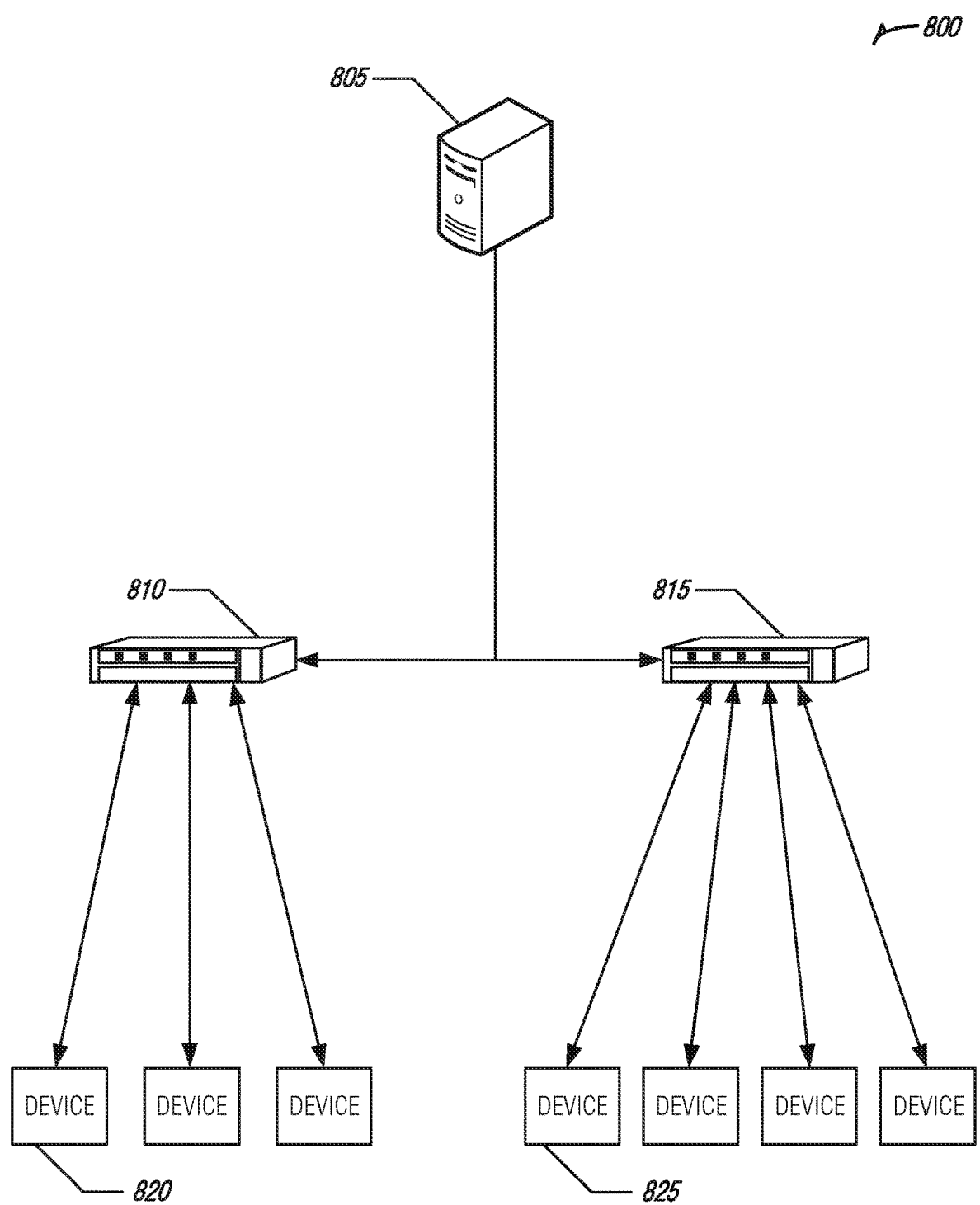
FIG. 8 illustrates a block diagram of an example architecture for delivering optimized energy to edge devices for tolerance-based intelligent edge network energy delivery, according to an embodiment.

FIG. 8 illustrates a block diagram of an example architecture 800 for delivering optimized energy to edge devices for tolerance-based intelligent edge network energy delivery, according to an embodiment. The architecture 800 may provide features as described in FIG. 1.

An optimization server 805 (e.g., a server located at the cloud service provider 120 as described in FIG. 1, etc.) collects charge requirements for a community of devices 820, 825 and computes a charge plan for each device using techniques such as, for example, evolutionary computing, etc. The individual charge plans (e.g., charging schedules, etc.) are then merged to observe their impact at the community level. A community of devices may be defined as a logical group of devices. The charge plans may need to be optimized at the community level. The charge plan solutions may be calculated N number of times. The value of N is a hyper-parameter selected on the basis of observation.

If the community is large, the computation time for optimal schedules drastically increases and thereby increases the delay in the generation of charge plans. Also, it has been observed that many devices in a community exhibit similar characteristics and energy consumption profiles.

To reduce this computation done on the optimization server, individual gateways 810, 815 (e.g., edge node 110, etc.) equipped with processing power may generate charge plans for the devices that are connected to them. This can be done using the same set of techniques used on the optimization server 805 (e.g., evolutionary computing, etc.). The gateways 810, 815 may then relay this information to the optimization server 805, which then synchronizes the charge plans received from other gateways and computes a community level optimal plan. This community level plan comprises a collection of individual device charge plans to give an overview of the entire community and to be used to calculate the community level cost in terms of energy used and/or price of total energy. This cost is then used as a feedback that is sent to the individual devices 820, 825 for further optimization. Additionally, the server looks for devices with similar characteristics and suggests the best charge plans amongst them to the other devices. This helps with faster convergence and as the diversity of devices with different characteristics in a community is low.

Figure 9:
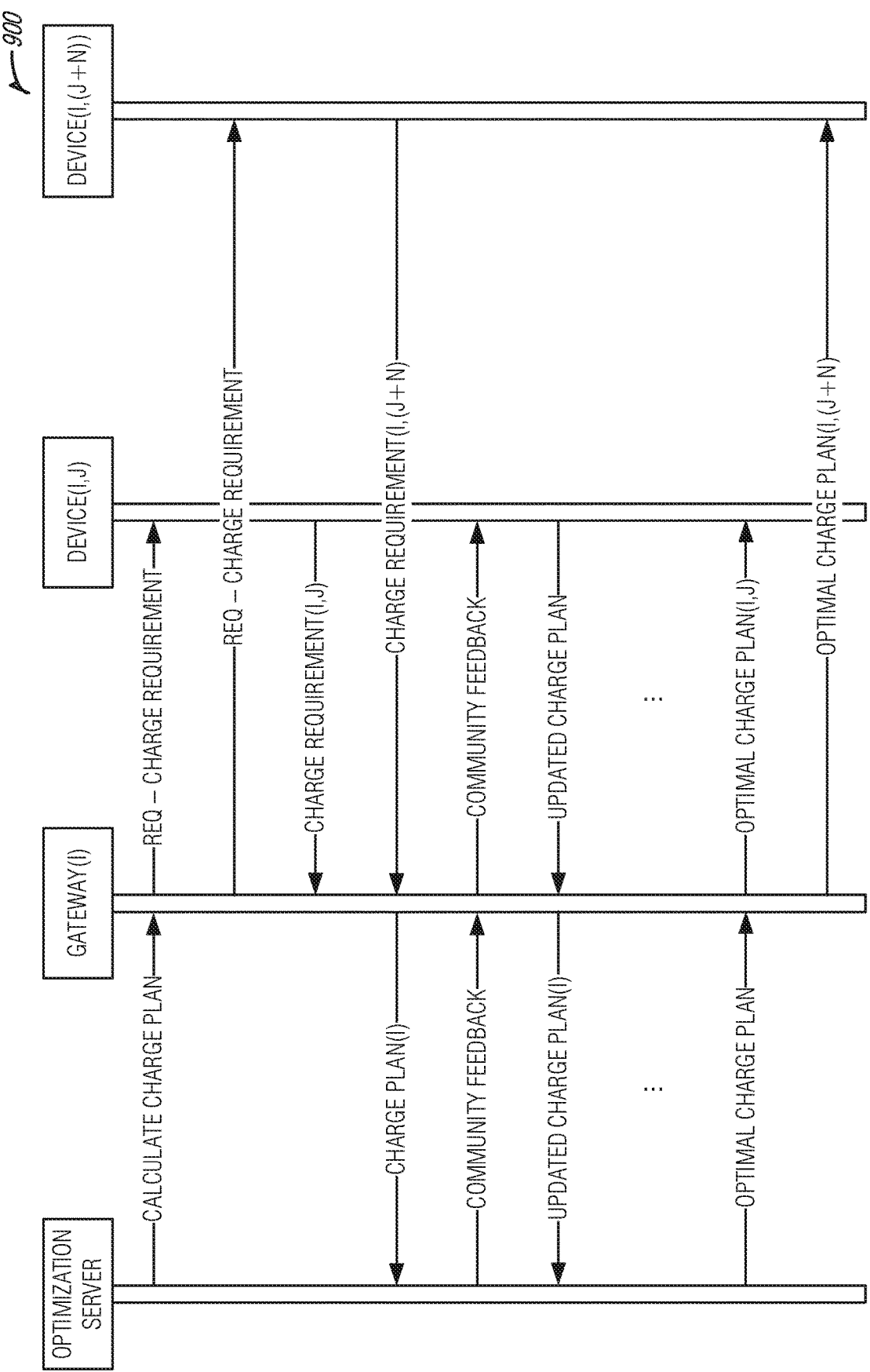
FIG. 9 illustrates a transaction diagram of an example of a sequence of controls exchanged between an optimization server and devices for tolerance-based intelligent edge network energy delivery, according to an embodiment.

FIG. 9 illustrates a transaction diagram 900 of an example of a sequence of controls exchanged between an optimization server and devices for tolerance-based intelligent edge network energy delivery, according to an embodiment. The timing diagram 900 may provide features as described in FIGS. 1 and 8.

The transaction diagram 900 shows the sequence of instructions exchanged between the optimization server and the devices. The optimization server (e.g., a server at the cloud service provider 120 as described in FIG. 1, etc.) initiates the optimization process by broadcasting to all gateways (e.g., edge node 110 as described in FIG. 1, etc.) to calculate charge plans for all devices (e.g., devices 115 as described in FIG. 1, etc.) under their control. The gateway then requests charge requirements from the individual devices charge requirements consists of information related to the device constraints as well user preferences. The gateway then calculates a charge plan for each device and broadcasts it back to the optimization server. The optimization server then calculates the community level cost by merging these individual charge plans and sends feedback for improving the charge plan to the gateways. The feedback may also include information related to another device with similar characteristics that has discovered a better charge plan. Based on the feedback the gateways re-compute a new charge plan and send it back to the optimization server for feedback. This process continues for N number of times. N is a hyper-parameter that is user defined or can be learned (e.g., using the machine learning processor 170 as described in FIG. 1, etc.) using a suitable learning algorithm. Once this is done, the optimization server sends optimal charge plans to the gateway which then forward it to the individual devices.

Although, this approach may increase the number of messages exchanged in the community, it significantly reduces the time required for calculating the optimal charge plan for the community as it is a compute intensive iterative process.

Figure 10:
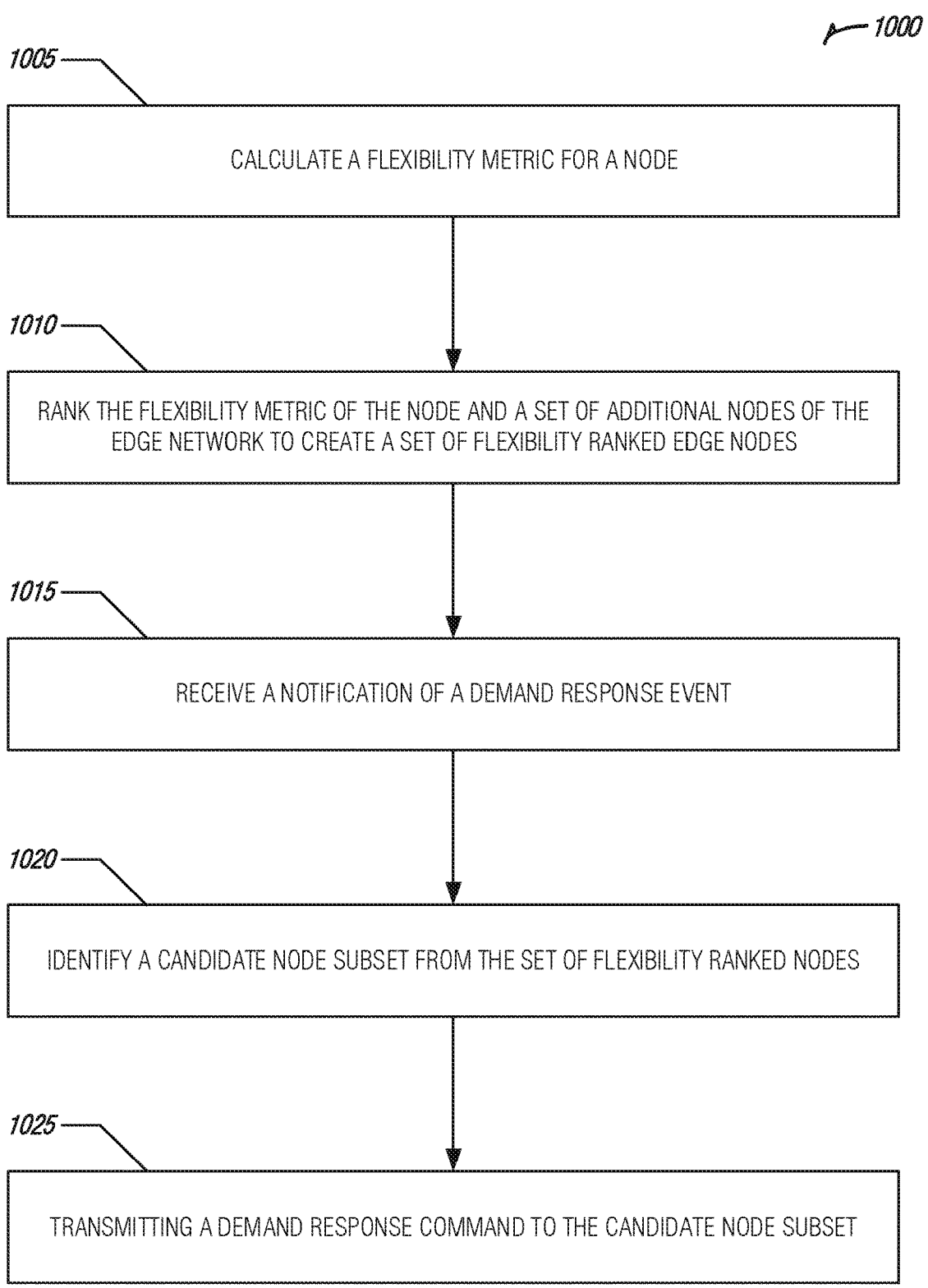
FIG. 10 illustrates an example of a method for tolerance-based intelligent edge network energy delivery, according to an embodiment.

FIG. 10 illustrates an example of a method 1000 for tolerance-based intelligent edge network energy delivery, according to an embodiment. The method 1000 may provide features as described in FIGS. 1-9.

A flexibility metric may be calculated (e.g., by the flexibility calculator 130 as described in FIG. 1, etc.) for a node of the edge network (e.g. at operation 1005). In an example, a set of device metrics may be obtained from the node and the flexibility metric may be calculated for the node based on the set of device metrics.

The flexibility metric of the node and flexibility metrics of a set of additional nodes of the edge network may be ranked (e.g., by the ranker 135 as described in FIG. 1, etc.) to create a set of flexibility ranked edge nodes (e.g., at operation 1010). A notification may be received (e.g., by the demand event receiver 145 as described in FIG. 1, etc.) of a demand response event (e.g., at operation 1015).

A candidate node subset may be identified (e.g., by the candidate node selector 150 as described in FIG. 1, etc.) from the set of flexibility ranked nodes based on requirements of the demand response event and a ranked order the set of flexibility ranked nodes (e.g., at operation 1020). In an example, an energy consumption value may be determined for each member of the set of flexibility ranked nodes. An energy need value may be identified that is included in the requirements of the demand response event. Members of the set of flexibility ranked nodes may be selected for inclusion in the candidate node subset based on the energy consumption value of each member until the energy need value is reached. The members may be selected in order based on their respective flexibility rank.

A demand response command may be transmitted (e.g., by the command transmitter 165 as described in FIG. 1, etc.) to the candidate node subset upon determining that the candidate node subset satisfies the requirements of the demand response event (e.g., at operation 1025). In an example, the demand response command may cause nodes of the candidate node subset to alter energy consumption for a time period coinciding with the demand response event.

In an example, execution of the demand response command by members of the candidate node subset may be tracked. It may be determined that the requirements of the demand response events were met and a notification of successful completion of the demand response event may be transmitted to a computing device.

In an example, it may be determined that the set of flexibility ranked nodes have combined flexibility metrics to satisfy a proposed demand response event and the proposed demand response event may be scheduled for execution by the set of flexibility ranked nodes.

In an example, a flexibility model may be generated for the node. The flexibility model may be generated by a machine learning engine. The flexibility model may be added to a set of flexibility models. A new node may be identified that is connected to an energy grid. A commencement flexibility model may be selected for the new node from the set of flexibility models based on a fit between metrics of the new node and the commencement flexibility model. A flexibility metric may be calculated for the new node using the commencement flexibility model and the new node may be added to the set of flexibility ranked nodes in ranked order based on the flexibility metric for the new node. In an example, a set of data points may be collected from a set of devices communicatively coupled to the new node. It may be determined that the set of data points is sufficient to generate the flexibility model and a deep neural network may be trained using the set of data points. The flexibility model may be a deep neural network model output based on the training. In an example, the flexibility model may be added to the set of flexibility models based on accuracy of flexibility predictions calculated for a device by the flexibility model.

In an example, charge requirements may be obtained from a set of devices connected to an energy grid. A charge plan may be generated for a device of the set of devices and the charge plan may be transmitted to the device. In an example, it may be identified that the device is communicatively coupled to a gateway device and the gateway device may be instructed to generate the charge plan and transmit the charge plan to the device. In an example, the charge plan may be received from the gateway device. The charge plan may be added to a set of community charge plans. The set of community charge plans may include additional charge plans received from other gateway devices. A community optimal charge plan may be generated based on an evaluation of the set of community charge plans and the community optimal charge plan may be transmitted to the gateway device. In an example, the community optimal charge plan generation may include evaluating costs of individual members of the set of community charge plans. In another example, the community optimal charge plan generation may include identifying devices having similar characteristics and evaluating the devices having similar characteristics as a group when evaluating the set of community charge plans.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

ADDITIONAL NOTES & EXAMPLES

Example 1 is a system for tolerance-based intelligent energy delivery at an edge network, the system comprising: at least one processor; and memory including instructions that, when executed by the at least one processor, cause the at least one processor to perform operations to: calculate a flexibility metric for a node of the edge network; receive a notification of a demand response event from a utility service communicatively coupled to the edge network; identify a candidate node subset from a set of flexibility-ranked nodes based on requirements of the demand response event and a ranked order of the set of flexibility-ranked nodes; the set of flexibility-ranked nodes including the node; and transmit a demand response command to the candidate node subset upon a determination that the candidate node subset satisfies the requirements of the demand response event, wherein the demand response command causes nodes of the candidate node subset to alter energy consumption for a time period coinciding with the demand response event.

In Example 2, the subject matter of Example 1 includes, wherein the instructions to identify the candidate node subset comprises instructions that cause the at least one processor to: determine an energy consumption value for each member of the set of flexibility-ranked nodes; identify an energy need value included in the requirements of the demand response event; and select members of the set of flexibility-ranked nodes for inclusion in the candidate node subset based on the energy consumption value of each member until the energy need value is reached, wherein the members are selected in order based on their respective flexibility rank.

In Example 3, the subject matter of Examples 1-2 includes, wherein the instructions to calculate a flexibility metric comprises instructions that cause the at least one processor to: obtain a set of device metrics from the node, wherein the flexibility metric for the node is calculated based on the set of device metrics.

In Example 4, the subject matter of Examples 1-3 includes, instructions that cause the at least one processor to: track execution of the demand response command by members of the candidate node subset; determine that the requirements of the demand response events were met; and transmit a notification of successful completion of the demand response event to a computing device.

In Example 5, the subject matter of Examples 1-4 includes, instructions that cause the at least one processor to: determine that the set of flexibility ranked nodes have combined flexibility metrics to satisfy a proposed demand response event; and schedule the proposed demand response event for execution by the set of flexibility ranked nodes.

In Example 6, the subject matter of Examples 1-5 includes, instructions that cause the at least one processor to: generate a flexibility model for the node, wherein the flexibility model is generated by a machine learning engine; add the flexibility model to a set of flexibility models; identify a new node connected to an energy grid; select a commencement flexibility model for the new node from the set of flexibility models based on a fit between metrics of the new node and the commencement flexibility model; calculate a flexibility metric for the new node using the commencement flexibility model; and add the new node to the set of flexibility-ranked nodes in ranked order based on the flexibility metric for the new node.

In Example 7, the subject matter of Example 6 includes, wherein the instructions to generate the flexibility model further comprises instructions that cause the at least one processor to: collect a set of data points from a set of devices communicatively coupled to the new node; determine that the set of data points is sufficient to generate the flexibility model; and train a deep neural network using the set of data points, wherein the flexibility model is a deep neural network model output based on the training.

In Example 8, the subject matter of Examples 6-7 includes, wherein the flexibility model is added to the set of flexibility models based on accuracy of flexibility predictions calculated for a device by the flexibility model.

In Example 9, the subject matter of Examples 1-8 includes, instructions that cause the at least one processor to: obtain charge requirements from a set of devices connected to an energy grid; generate a charge plan for a device of the set of devices based on the charge requirements; and transmit the charge plan to the device.

In Example 10, the subject matter of Example 9 includes, instructions that cause the at least one processor to: identify that the device is communicatively coupled to a gateway device; and instruct the gateway device to generate the charge plan and transmit the charge plan to the device.

In Example 11, the subject matter of Example 10 includes, instructions that cause the at least one processor to: receive the charge plan from the gateway device; add the charge plan to a set of community charge plans, wherein the set of community charge plans includes additional charge plans received from other gateway devices; generate a community selected charge plan based on an evaluation of the set of community charge plans; and transmit the community selected charge plan to the gateway device.

In Example 12, the subject matter of Example 11 includes, wherein the instructions to generate the community selected charge plan includes instructions to evaluate costs of individual members of the set of community charge plans.

In Example 13, the subject matter of Examples 11-12 includes, wherein the instructions to generate the community selected charge plan includes instructions to identify devices that have similar characteristics and instructions to evaluate the devices that have similar characteristics as a group when the set of community charge plans is evaluated.

In Example 14, the subject matter of Examples 1-13 includes, wherein the utility service is communicatively coupled to the edge network via a cloud service provider.

In Example 15, the subject matter of Examples 1-14 includes, wherein the flexibility metric indicates a level of tolerance for an outage of the node caused by the demand response event.

In Example 16, the subject matter of Examples 1-15 includes, wherein the instructions to calculate the flexibility metric for the node comprises instructions that cause the at least one processor to: evaluate a set of device metrics for the node using a flexibility function to determine an impact to a user of the device when the demand response command is transmitted to the node, wherein the flexibility metric indicates the relative tolerance of the node to the result of execution of the demand response command.

Example 17 is at least one non-transitory machine-readable medium including instructions for tolerance-based intelligent energy delivery at an edge network that, when executed by at least one processor, cause the at least one processor to perform operations to: calculate a flexibility metric for a node of the edge network; receive a notification of a demand response event from a utility service communicatively coupled to the edge network; identify a candidate node subset from a set of flexibility-ranked nodes based on requirements of the demand response event and a ranked order of the set of flexibility-ranked nodes; the set of flexibility-ranked nodes including the node; and transmit a demand response command to the candidate node subset upon a determination that the candidate node subset satisfies the requirements of the demand response event, wherein the demand response command causes nodes of the candidate node subset to alter energy consumption for a time period coinciding with the demand response event.

In Example 18, the subject matter of Example 17 includes, wherein the instructions to identify the candidate node subset comprises instructions that cause the at least one processor to: determine an energy consumption value for each member of the set of flexibility-ranked nodes; identify an energy need value included in the requirements of the demand response event; and select members of the set of flexibility-ranked nodes for inclusion in the candidate node subset based on the energy consumption value of each member until the energy need value is reached, wherein the members are selected in order based on their respective flexibility rank.

In Example 19, the subject matter of Examples 17-18 includes, wherein the instructions to calculate a flexibility metric comprises instructions that cause the at least one processor to: obtain a set of device metrics from the node, wherein the flexibility metric for the node is calculated based on the set of device metrics.

In Example 20, the subject matter of Examples 17-19 includes, instructions that cause the at least one processor to: track execution of the demand response command by members of the candidate node subset; determine that the requirements of the demand response events were met; and transmit a notification of successful completion of the demand response event to a computing device.

In Example 21, the subject matter of Examples 17-20 includes, instructions that cause the at least one processor to: determine that the set of flexibility ranked nodes have combined flexibility metrics to satisfy a proposed demand response event; and schedule the proposed demand response event for execution by the set of flexibility ranked nodes.

In Example 22, the subject matter of Examples 17-21 includes, instructions that cause the at least one processor to: generate a flexibility model for the node, wherein the flexibility model is generated by a machine learning engine; add the flexibility model to a set of flexibility models; identify a new node connected to an energy grid; select a commencement flexibility model for the new node from the set of flexibility models based on a fit between metrics of the new node and the commencement flexibility model; calculate a flexibility metric for the new node using the commencement flexibility model; and add the new node to the set of flexibility-ranked nodes in ranked order based on the flexibility metric for the new node.

In Example 23, the subject matter of Example 22 includes, wherein the instructions to generate the flexibility model further comprises instructions that cause the at least one processor to: collect a set of data points from a set of devices communicatively coupled to the new node; determine that the set of data points is sufficient to generate the flexibility model; and train a deep neural network using the set of data points, wherein the flexibility model is a deep neural network model output based on the training.

In Example 24, the subject matter of Examples 22-23 includes, wherein the flexibility model is added to the set of flexibility models based on accuracy of flexibility predictions calculated for a device by the flexibility model.

In Example 25, the subject matter of Examples 17-24 includes, instructions that cause the at least one processor to: obtain charge requirements from a set of devices connected to an energy grid; generate a charge plan for a device of the set of devices based on the charge requirements; and transmit the charge plan to the device.

In Example 26, the subject matter of Example 25 includes, instructions that cause the at least one processor to: identify that the device is communicatively coupled to a gateway device; and instruct the gateway device to generate the charge plan and transmit the charge plan to the device.

In Example 27, the subject matter of Example 26 includes, instructions that cause the at least one processor to: receive the charge plan from the gateway device; add the charge plan to a set of community charge plans, wherein the set of community charge plans includes additional charge plans received from other gateway devices; generate a community selected charge plan based on an evaluation of the set of community charge plans; and transmit the community selected charge plan to the gateway device.

In Example 2$, the subject matter of Example 27 includes, wherein the instructions to generate the community selected charge plan includes instructions to evaluate costs of individual members of the set of community charge plans.

In Example 29, the subject matter of Examples 27-28 includes, wherein the instructions to generate the community selected charge plan includes instructions to identify devices that have similar characteristics and instructions to evaluate the devices that have similar characteristics as a group when the set of community charge plans is evaluated.

In Example 30, the subject matter of Examples 17-29 includes, wherein the utility service is communicatively coupled to the edge network via a cloud service provider.

In Example 31, the subject matter of Examples 17-30 includes, wherein the flexibility metric indicates a level of tolerance for an outage of the node caused by the demand response event.

In Example 32, the subject matter of Examples 17-31 includes, wherein the instructions to calculate the flexibility metric for the node comprises instructions that cause the at least one processor to: evaluate a set of device metrics for the node using a flexibility function to determine an impact to a user of the device when the demand response command is transmitted to the node, wherein the flexibility metric indicates the relative tolerance of the node to the result of execution of the demand response command.

Example 33 is a method for tolerance-based intelligent energy delivery at an edge network, the method comprising: calculating a flexibility metric for a node of the edge network; receiving a notification of a demand response event from a utility service communicatively coupled to the edge network; identifying a candidate node subset from a set of flexibility-ranked nodes based on requirements of the demand response event and a ranked order of the set of flexibility-ranked nodes, wherein the set of flexibility-ranked nodes includes, the node; and transmitting a demand response command to the candidate node subset upon determining that the candidate node subset satisfies the requirements of the demand response event, wherein the demand response command causes nodes of the candidate node subset to alter energy consumption for a time period coinciding with the demand response event.

In Example 34, the subject matter of Example 33 includes, wherein identifying the candidate node subset comprises: determining an energy consumption value for each member of the set of flexibility-ranked nodes; identifying an energy need value included in the requirements of the demand response event; and selecting members of the set of flexibility-ranked nodes for inclusion in the candidate node subset based on the energy consumption value of each member until the energy need value is reached, wherein the members are selected in order based on their respective flexibility rank.

In Example 35, the subject matter of Examples 33-34 includes, wherein calculating a flexibility metric comprises: obtaining a set of device metrics from the node, wherein the flexibility metric for the node is calculated based on the set of device metrics.

In Example 36, the subject matter of Examples 33-35 includes, tracking execution of the demand response command by members of the candidate node subset; determining that the requirements of the demand response events were met; and transmitting a notification of successful completion of the demand response event to a computing device.

In Example 37, the subject matter of Examples 33-36 includes, determining that the set of flexibility ranked nodes have combined flexibility metrics to satisfy a proposed demand response event; and scheduling the proposed demand response event for execution by the set of flexibility ranked nodes.

In Example 38, the subject matter of Examples 33-37 includes, generating a flexibility model for the node, wherein the flexibility model is generated by a machine learning engine; adding the flexibility model to a set of flexibility models; identifying a new node connected to an energy grid; selecting a commencement flexibility model for the new node from the set of flexibility models based on a fit between metrics of the new node and the commencement flexibility model; calculating a flexibility metric for the new node using the commencement flexibility model; and adding the new node to the set of flexibility-ranked nodes in ranked order based on the flexibility metric for the new node.

In Example 39, the subject matter of Example 38 includes, wherein generating the flexibility model further comprises: collecting a set of data points from a set of devices communicatively coupled to the new node; determining that the set of data points is sufficient to generate the flexibility model; and training a deep neural network using the set of data points, wherein the flexibility model is a deep neural network model output based on the training.

In Example 40, the subject matter of Examples 38-39 includes, wherein the flexibility model is added to the set of flexibility models based on accuracy of flexibility predictions calculated for a device by the flexibility model.

In Example 41, the subject matter of Examples 33-40 includes, obtaining charge requirements from a set of devices connected to an energy grid; generating a charge plan for a device of the set of devices based on the charge requirements; and transmitting the charge plan to the device.

In Example 42, the subject matter of Example 41 includes, identifying that the device is communicatively coupled to a gateway device; and instructing the gateway device to generate the charge plan and transmit the charge plan to the device.

In Example 43, the subject matter of Example 42 includes, receiving the charge plan from the gateway device; adding the charge plan to a set of community charge plans, wherein the set of community charge plans includes additional charge plans received from other gateway devices; generating a community selected charge plan based on an evaluation of the set of community charge plans; and transmitting the community selected charge plan to the gateway device.

In Example 44, the subject matter of Example 43 includes, wherein generating the community selected charge plan includes evaluating costs of individual members of the set of community charge plans.

In Example 45, the subject matter of Examples 43-44 includes, wherein generating the community selected charge plan includes identifying devices having similar characteristics and evaluating the devices having similar characteristics as a group when evaluating the set of community charge plans.

In Example 46, the subject matter of Examples 33-45 includes, wherein the utility service is communicatively coupled to the edge network via a cloud service provider.

In Example 47, the subject matter of Examples 33-46 includes, wherein the flexibility metric indicates a level of tolerance for an outage of the node caused by the demand response event.

In Example 48, the subject matter of Examples 33-47 includes, wherein calculating the flexibility metric for the node comprises: evaluating a set of device metrics for the node using a flexibility function to determine an impact to a user of the device when the demand response command is transmitted to the node, wherein the flexibility metric indicates the relative tolerance of the node to the result of execution of the demand response command.

Example 49 is at least one machine-readable medium including instructions, which when executed by a machine, cause the machine to perform operations of any of the methods of Examples 33-48.

Example 50 is an apparatus comprising means for performing any of the methods of Examples 33-48.

Example 51 is a system for tolerance-based intelligent energy delivery at an edge network, the system comprising: means for calculating a flexibility metric for a node of the edge network; means for receiving a notification of a demand response event from a utility service communicatively coupled to the edge network; means for identifying a candidate node subset from a set of flexibility-ranked nodes based on requirements of the demand response event and a ranked order of the set of flexibility-ranked nodes, wherein the set of flexibility-ranked nodes includes, the node; and means for transmitting a demand response command to the candidate node subset upon determining that the candidate node subset satisfies the requirements of the demand response event, wherein the demand response command causes nodes of the candidate node subset to alter energy consumption for a time period coinciding with the demand response event.

In Example 52, the subject matter of Example 51 includes, wherein the means for identifying the candidate node subset comprises: means for determining an energy consumption value for each member of the set of flexibility-ranked nodes; means for identifying an energy need value included in the requirements of the demand response event; and means for selecting members of the set of flexibility-ranked nodes for inclusion in the candidate node subset based on the energy consumption value of each member until the energy need value is reached, wherein the members are selected in order based on their respective flexibility rank.

In Example 53, the subject matter of Examples 51-52 includes, wherein the means for calculating a flexibility metric comprises: means for obtaining a set of device metrics from the node, wherein the flexibility metric for the node is calculated based on the set of device metrics.

In Example 54, the subject matter of Examples 51-53 includes, means for tracking execution of the demand response command by members of the candidate node subset; means for determining that the requirements of the demand response events were met; and means for transmitting a notification of successful completion of the demand response event to a computing device.

In Example 55, the subject matter of Examples 51-54 includes, means for determining that the set of flexibility ranked nodes have combined flexibility metrics to satisfy a proposed demand response event; and means for scheduling the proposed demand response event for execution by the set of flexibility ranked nodes.

In Example 56, the subject matter of Examples 51-55 includes, means for generating a flexibility model for the node, wherein the flexibility model is generated by a machine learning engine; means for adding the flexibility model to a set of flexibility models; means for identifying a new node connected to an energy grid; means for selecting a commencement flexibility model for the new node from the set of flexibility models based on a fit between metrics of the new node and the commencement flexibility model; means for calculating a flexibility metric for the new node using the commencement flexibility model; and means for adding the new node to the set of flexibility-ranked nodes in ranked order based on the flexibility metric for the new node.

In Example 57, the subject matter of Example 56 includes, wherein the means for generating the flexibility model further comprises: means for collecting a set of data points from a set of devices communicatively coupled to the new node; means for determining that the set of data points is sufficient to generate the flexibility model; and means for training a deep neural network using the set of data points, wherein the flexibility model is a deep neural network model output based on the training.

In Example 58, the subject matter of Examples 56-57 includes, wherein the flexibility model is added to the set of flexibility models based on accuracy of flexibility predictions calculated for a device by the flexibility model.

In Example 59, the subject matter of Examples 51-58 includes, means for obtaining charge requirements from a set of devices connected to an energy grid; means for generating a charge plan for a device of the set of devices based on the charge requirements; and means for transmitting the charge plan to the device.

In Example 60, the subject matter of Example 59 includes, means for identifying that the device is communicatively coupled to a gateway device; and means for instructing the gateway device to generate the charge plan and transmit the charge plan to the device.

In Example 61, the subject matter of Example 60 includes, means for receiving the charge plan from the gateway device; means for adding the charge plan to a set of community charge plans, wherein the set of community charge plans includes additional charge plans received from other gateway devices; means for generating a community selected charge plan based on an evaluation of the set of community charge plans; and means for transmitting the community selected charge plan to the gateway device.

In Example 62, the subject matter of Example 61 includes, wherein the means for generating the community selected charge plan includes means for evaluating costs of individual members of the set of community charge plans.

In Example 63, the subject matter of Examples 61-62 includes, wherein the means for generating the community selected charge plan includes means for identifying devices having similar characteristics and means for evaluating the devices having similar characteristics as a group when evaluating the set of community charge plans.

In Example 64, the subject matter of Examples 51-63 includes, wherein the utility service is communicatively coupled to the edge network via a cloud service provider.

In Example 65, the subject matter of Examples 51-64 includes, wherein the flexibility metric indicates a level of tolerance for an outage of the node caused by the demand response event.

In Example 66, the subject matter of Examples 51-65 includes, wherein the means for calculating the flexibility metric for the node comprises: means for evaluating a set of device metrics for the node using a flexibility function to determine an impact to a user of the device when the demand response command is transmitted to the node, wherein the flexibility metric indicates the relative tolerance of the node to the result of execution of the demand response command.

Example 67 is at least one machine-readable medium including instructions that, when executed by processing circuitry, cause the processing circuitry to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for tolerance-based intelligent energy delivery at an edge network, the system comprising:
    at least one processor; and
    memory including instructions that, when executed by the at least one processor, cause the at least one processor to perform operations to:
        calculate a flexibility metric for a node of the edge network;
        receive a notification of a demand response event from a utility service communicatively coupled to the edge network;
        identify a candidate node subset from a set of flexibility-ranked nodes based on requirements of the demand response event and a ranked order of the set of flexibility-ranked nodes; the set of flexibility-ranked nodes including the node; and
        transmit a demand response command to the candidate node subset upon a determination that the candidate node subset satisfies the requirements of the demand response event, wherein the demand response command causes nodes of the candidate node subset to alter energy consumption for a time period coinciding with the demand response event.

2. The system of claim 1, wherein the instructions to identify the candidate node subset comprises instructions that cause the at least one processor to:
    determine an energy consumption value for each member of the set of flexibility-ranked nodes;
    identify an energy need value included in the requirements of the demand response event; and
    select members of the set of flexibility-ranked nodes for inclusion in the candidate node subset based on the energy consumption value of each member until the energy need value is reached, wherein the members are selected in order based on their respective flexibility rank.

3. The system of claim 1, further comprising instructions that cause the at least one processor to:
    track execution of the demand response command by members of the candidate node subset;
    determine that the requirements of the demand response events were met; and
    transmit a notification of successful completion of the demand response event to a computing device.

4. The system of claim 1 further comprising instructions that cause the at least one processor to:
    determine that the set of flexibility ranked nodes have combined flexibility metrics to satisfy a proposed demand response event; and
    schedule the proposed demand response event for execution by the set of flexibility ranked nodes.

5. The system of claim 1, further comprising instructions that cause the at least one processor to:
    generate a flexibility model for the node, wherein the flexibility model is generated by a machine learning engine;
    add the flexibility model to a set of flexibility models;
    identify a new node connected to an energy grid;
    select a commencement flexibility model for the new node from the set of flexibility models based on a fit between metrics of the new node and the commencement flexibility model;
    calculate a flexibility metric for the new node using the commencement flexibility model; and
    add the new node to the set of flexibility-ranked nodes in ranked order based on the flexibility metric for the new node.

6. The system of claim 1, further comprising instructions that cause the at least one processor to:
    obtain charge requirements from a set of devices connected to an energy grid;
    generate a charge plan for a device of the set of devices based on the charge requirements; and
    transmit the charge plan to the device.

7. The system of claim 6, further comprising instructions that cause the at least one processor to:
    identify that the device is communicatively coupled to a gateway device; and
    instruct the gateway device to generate the charge plan and transmit the charge plan to the device.

8. The system of claim 7, further comprising instructions that cause the at least one processor to:
    receive the charge plan from the gateway device;
    add the charge plan to a set of community charge plans, wherein the set of community charge plans includes additional charge plans received from other gateway devices;
    generate a community selected charge plan based on an evaluation of the set of community charge plans; and
    transmit the community selected charge plan to the gateway device.

9. At least one non-transitory machine-readable medium including instructions for tolerance-based intelligent energy delivery at an edge network that, when executed by at least one processor, cause the at least one processor to perform operations to:
    calculate a flexibility metric for a node of the edge network;

receive a notification of a demand response event from a utility service communicatively coupled to the edge network;

identify a candidate node subset from a set of flexibility-ranked nodes based on requirements of the demand response event and a ranked order of the set of flexibility-ranked nodes; the set of flexibility-ranked nodes including the node; and transmit a demand response command to the candidate node subset upon a determination that the candidate node subset satisfies the requirements of the demand response event, wherein the demand response command causes nodes of the candidate node subset to alter energy consumption for a time period coinciding with the demand response event.

10. The at least one non-transitory machine-readable medium of claim 9, wherein the instructions to identify the candidate node subset comprises instructions that cause the at least one processor to:

determine an energy consumption value for each member of the set of flexibility-ranked nodes;

identify an energy need value included in the requirements of the demand response event; and select members of the set of flexibility-ranked nodes for inclusion in the candidate node subset based on the energy consumption value of each member until the energy need value is reached, wherein the members are selected in order based on their respective flexibility rank.

11. The at least one non-transitory machine-readable medium of claim 9, further comprising instructions that cause the at least one processor to:

track execution of the demand response command by members of the candidate node subset;

determine that the requirements of the demand response events were met; and transmit a notification of successful completion of the demand response event to a computing device.

12. The at least one non-transitory machine-readable medium of claim 9 further comprising instructions that cause the at least one processor to:

determine that the set of flexibility ranked nodes have combined flexibility metrics to satisfy a proposed demand response event; and schedule the proposed demand response event for execution by the set of flexibility ranked nodes.

13. The at least one non-transitory machine-readable medium of claim 9, further comprising instructions that cause the at least one processor to:

generate a flexibility model for the node, wherein the flexibility model is generated by a machine learning engine;

add the flexibility model to a set of flexibility models;

identify a new node connected to an energy grid;

select a commencement flexibility model for the new node from the set of flexibility models based on a fit between metrics of the new node and the commencement flexibility model;

calculate a flexibility metric for the new node using the commencement flexibility model; and add the new node to the set of flexibility-ranked nodes in ranked order based on the flexibility metric for the new node.

14. The at least one non-transitory machine-readable medium of claim 9, further comprising instructions that cause the at least one processor to:

obtain charge requirements from a set of devices connected to an energy grid;

generate a charge plan for a device of the set of devices based on the charge requirements; and transmit the charge plan to the device.

15. The at least one non-transitory machine-readable medium of claim 14, further comprising instructions that cause the at least one processor to:

identify that the device is communicatively coupled to a gateway device; and instruct the gateway device to generate the charge plan and transmit the charge plan to the device.

16. The at least one non-transitory machine-readable medium of claim 15, further comprising instructions that cause the at least one processor to:

receive the charge plan from the gateway device;

add the charge plan to a set of community charge plans, wherein the set of community charge plans includes additional charge plans received from other gateway devices;

generate a community selected charge plan based on an evaluation of the set of community charge plans; and transmit the community selected charge plan to the gateway device.

17. A method for tolerance-based intelligent energy delivery at an edge network, the method comprising:

calculating a flexibility metric for a node of the edge network;

receiving a notification of a demand response event from a utility service communicatively coupled to the edge network;

identifying a candidate node subset from a set of flexibility-ranked nodes based on requirements of the demand response event and a ranked order of the set of flexibility-ranked nodes, wherein the set of flexibility-ranked nodes includes the node; and transmitting a demand response command to the candidate node subset upon determining that the candidate node subset satisfies the requirements of the demand response event, wherein the demand response command causes nodes of the candidate node subset to alter energy consumption for a time period coinciding with the demand response event.

18. The method of claim 17, wherein identifying the candidate node subset comprises:

determining an energy consumption value for each member of the set of flexibility-ranked nodes;

identifying an energy need value included in the requirements of the demand response event; and selecting members of the set of flexibility-ranked nodes for inclusion in the candidate node subset based on the energy consumption value of each member until the energy need value is reached, wherein the members are selected in order based on their respective flexibility rank.

19. The method of claim 17, further comprising:

tracking execution of the demand response command by members of the candidate node subset;

determining that the requirements of the demand response events were met; and transmitting a notification of successful completion of the demand response event to a computing device.

20. The method of claim 17 further comprising:

determining that the set of flexibility ranked nodes have combined flexibility metrics to satisfy a proposed demand response event; and scheduling the proposed demand response event for execution by the set of flexibility ranked nodes.

21. The method of claim 17, further comprising:

generating a flexibility model for the node, wherein the flexibility model is generated by a machine learning engine;

adding the flexibility model to a set of flexibility models;

identifying a new node connected to an energy grid;

selecting a commencement flexibility model for the new node from the set of flexibility models based on a fit between metrics of the new node and the commencement flexibility model;

calculating a flexibility metric for the new node using the commencement flexibility model; and adding the new node to the set of flexibility-ranked nodes in ranked order based on the flexibility metric for the new node.

22. The method of claim 17, further comprising:

obtaining charge requirements from a set of devices connected to an energy grid;

generating a charge plan for a device of the set of devices based on the charge requirements; and transmitting the charge plan to the device.

23. The method of claim 22, further comprising:

identifying that the device is communicatively coupled to a gateway device; and instructing the gateway device to generate the charge plan and transmit the charge plan to the device.

24. The method of claim 23, further comprising:

receiving the charge plan from the gateway device;

adding the charge plan to a set of community charge plans, wherein the set of community charge plans includes additional charge plans received from other gateway devices;

generating a community selected charge plan based on an evaluation of the set of community charge plans; and transmitting the community selected charge plan to the gateway device.

* * * * *